(12) United States Patent
Kaukopaasi et al.

(10) Patent No.: US 11,273,399 B2
(45) Date of Patent: Mar. 15, 2022

(54) FILTER MEDIUM, METHOD OF MANUFACTURING THE SAME AND USES THEREOF

(71) Applicant: Ahlstrom-Munksjö Oyj, Helsinki (FI)

(72) Inventors: Jan Kaukopaasi, Kotka (FI); Anne Viskari, Kotka (FI)

(73) Assignee: Ahlstrom-Munksjö Oyj, Helsinki (FI)

( * ) Notice: Subject to any disclaimer, the term of this patent is extended or adjusted under 35 U.S.C. 154(b) by 661 days.

(21) Appl. No.: 16/096,822

(22) PCT Filed: Apr. 28, 2017

(86) PCT No.: PCT/FI2017/050326
§ 371 (c)(1),
(2) Date: Oct. 26, 2018

(87) PCT Pub. No.: WO2017/187021
PCT Pub. Date: Nov. 2, 2017

(65) Prior Publication Data
US 2019/0126176 A1    May 2, 2019

(30) Foreign Application Priority Data
Apr. 29, 2016    (FI) .................................... 20165374

(51) Int. Cl.
*B01D 53/02* (2006.01)
*B01D 39/16* (2006.01)
(Continued)

(52) U.S. Cl.
CPC ........... *B01D 39/163* (2013.01); *B01D 39/18* (2013.01); *B01D 39/2017* (2013.01);
(Continued)

(58) Field of Classification Search
CPC .... B01D 2239/0216; B01D 2239/0241; B01D 2239/0407; B01D 2239/0435;
(Continued)

(56) References Cited

U.S. PATENT DOCUMENTS

| 4,375,718 A | 3/1983 | Wadsorth et al. |
| 5,403,383 A * | 4/1995 | Jaisinghani ............. B03C 3/155 422/22 |

(Continued)

FOREIGN PATENT DOCUMENTS

| CN | 102225281 | 10/2011 |
| GB | 2 329 598 | 3/1999 |

(Continued)

OTHER PUBLICATIONS

International Search Report for PCT/FI2017/050326, dated Oct. 6, 2017, 5 pages.

(Continued)

*Primary Examiner* — Christopher P Jones
(74) *Attorney, Agent, or Firm* — Laine IP Oy

(57) ABSTRACT

A filter medium comprising a first conductive fibrous substrate, a second conductive fibrous substrate spaced apart from the first conductive substrate and a third insulation substrate fitted between the first and the second substrates for electrically separating the first conductive substrate from the second conductive substrate. The first conductive fibrous substrate comprises a first layer with first fibers having a first average diameter; a second layer with second fibers having a second average diameter; and a third layer with third fibers having a third average diameter. The second layer comprises activated carbon in an amount sufficient to render the first fibrous substrate conductive. The present medium can be used in electrified filters for cabin air filtration for passenger cars and other vehicles. It can also be used for HVAC (Continued)

filtration for indoor air, and in portable air purification units and even in vacuum cleaners.

29 Claims, 4 Drawing Sheets

(51) Int. Cl.
| | | |
|---|---|---|
| *B01D 39/18* | (2006.01) | |
| *B01D 39/20* | (2006.01) | |
| *B01D 46/00* | (2022.01) | |
| *B01D 53/04* | (2006.01) | |
| *B03C 3/155* | (2006.01) | |

(52) U.S. Cl.
CPC ..... *B01D 46/0032* (2013.01); *B01D 46/0036* (2013.01); *B01D 53/04* (2013.01); *B03C 3/155* (2013.01); *B01D 2239/0216* (2013.01); *B01D 2239/0241* (2013.01); *B01D 2239/0407* (2013.01); *B01D 2239/0435* (2013.01); *B01D 2239/0478* (2013.01); *B01D 2239/064* (2013.01); *B01D 2239/065* (2013.01); *B01D 2239/0618* (2013.01); *B01D 2239/0636* (2013.01); *B01D 2239/0654* (2013.01); *B01D 2239/10* (2013.01); *B01D 2239/1233* (2013.01); *B01D 2239/1241* (2013.01); *B01D 2239/1258* (2013.01); *B01D 2253/102* (2013.01); *B01D 2257/106* (2013.01); *B01D 2259/4508* (2013.01); *B01D 2259/4566* (2013.01); *B01D 2279/50* (2013.01); *B01D 2279/55* (2013.01); *B03C 2201/30* (2013.01)

(58) Field of Classification Search
CPC .... B01D 2239/0478; B01D 2239/0618; B01D 2239/0636; B01D 2239/064; B01D 2239/065; B01D 2239/0654; B01D 2239/10; B01D 2239/1233; B01D 2239/1241; B01D 2239/1258; B01D 2253/102; B01D 2257/106; B01D 2259/4508; B01D 2259/4566; B01D 2279/50; B01D 2279/55; B01D 39/163; B01D 39/18; B01D 39/2017; B01D 46/0032; B01D 46/0036; B01D 53/04; B03C 2201/30; B03C 3/155
See application file for complete search history.

(56) References Cited

U.S. PATENT DOCUMENTS

| | | | |
|---|---|---|---|
| 6,527,834 B1 | 3/2003 | Joerder et al. | |
| 6,955,708 B1* | 10/2005 | Julos | F24F 8/30 |
| | | | 95/59 |
| 7,513,933 B2 | 4/2009 | Coppom et al. | |
| 7,717,986 B2 | 5/2010 | Lotgerink-Bruinenberg | |
| 2009/0221047 A1* | 9/2009 | Schindler | B01D 39/04 |
| | | | 435/160 |
| 2012/0282157 A1* | 11/2012 | Kusuura | B03C 3/368 |
| | | | 423/210 |
| 2013/0037481 A1 | 2/2013 | Lalouch et al. | |
| 2014/0130469 A1* | 5/2014 | Nagy | B01D 39/1607 |
| | | | 55/487 |
| 2016/0136553 A1* | 5/2016 | Healey | B01D 39/2017 |
| | | | 55/486 |
| 2016/0166953 A1* | 6/2016 | Swaminathan | B01D 39/1623 |
| | | | 55/486 |
| 2016/0361674 A1* | 12/2016 | Swaminathan | B01D 39/04 |
| 2017/0232386 A1* | 8/2017 | Hartbrich | B01D 53/70 |
| | | | 95/148 |
| 2019/0314747 A1* | 10/2019 | Nagy | B01D 39/1623 |

FOREIGN PATENT DOCUMENTS

| | | |
|---|---|---|
| JP | 5067084 | 11/2012 |
| WO | 98/22222 | 5/1998 |
| WO | 2004/096413 | 11/2004 |
| WO | 2007/135232 | 11/2007 |

OTHER PUBLICATIONS

Written Opinion of the ISA for PCT/FI2017/050326, dated Oct. 6, 2017, 11 pages.
Search Report for FI20165374, dated Nov. 30, 2016, 2 pages.

* cited by examiner

FILTER MEDIUM, METHOD OF MANUFACTURING THE SAME AND USES THEREOF

This application is the U.S. national phase of International Application No. PCT/FI2017/050326 filed 28 Apr. 2017, which designated the U.S. and claims priority to FI Patent Application No. 20165374 filed 29 Apr. 2016, the entire contents of each of which are hereby incorporated by reference.

FIELD

The present invention relates to filter media and uses thereof. In particular the present invention concerns a filter medium suitable for use in electrified filters. The present invention also concerns methods of producing the medium and to the uses of the media in particular for purification of air.

BACKGROUND

There are a number of known filters for separating particles, such as dust particles, from air. Both mechanical filters and electrically charged (electrets) are being used.

One problem associated with mechanical filters is that in order to reach high efficiencies for submicron size particles the pressure drop becomes very high.

In electrically charged air filters the filtering efficiency is enhanced by directing an electric voltage into the filter, whereby the electric field formed guides charged dust particles into the filter material. Electrically charged filter typically are provided with two electrically conductive metal nets or plates on both sides of a non-conductive filter proper, forming a filtration assembly. The metal nets or plates are connected to a voltage source by which the filter assembly can be charged.

For electrets one problem is that the electrical charge is sensitive to humidity, temperature variations, and the filter getting contaminated. As a consequence, when the charge is lost so is the efficiency.

Various improved filter constructions, in which the conductive plates are integrated into the filter, are suggested in the art. JP 5067084 B2 discloses the filter system which includes ionization upstream and filter media sheets. The filter media consist of conducting activated carbon on semi-conductive filter media sheets.

WO2007/135232A1 discloses a multilayer filter structure with a fibrous isolation layer and two surface layers which are formed by a fibrous support matrix treated with an electrically conductive polymer so that it has become conductive. The fibrous support matrix can be of natural fiber, glass fiber or woven or non-woven fabric; the fibrous isolation layer is a cellulose layer. WO2007/135232A1 teaches that an increase in particle separation efficiency can be achieved by providing the particles to be separated from the air with an electric charge using, for example, a corona wire, before the air stream is conducted through the filter material.

Further art is represented by U.S. Pat. No. 7,513,933 B2, U.S. Pat. Nos. 5,403,383A, 7,717,986 B2, WO 9822222 A1, GB 2329598 A and CN 102225281.

Compared to conventional metal nets or plates, a fibrous support matrix treated with an electrically conductive polymer typically gives rise to a greater loss of pressure during filtration.

A further disadvantage of the filters disclosed in JP 5067084 B2 and WO2007/135232 is that the ionization used in order to achieve efficient separation of the particles from air involves the generation of ozone which is a hazardous gas which needs to be removed from the effluent of the filtration.

SUMMARY OF INVENTION

It is an aim of the present invention to eliminate at least a part of the problems related to the art and to provide an improved filtration medium suitable for electrified filter elements which are used together with ionizing pre-chargers.

In an embodiment, the present technology provides for a method of purifying gas with an electrified filter system comprising the steps of providing a gas stream containing suspended particles, in particular contaminant particles; pre-charging the particles in particular in an ionization zone and conducting the gas stream thus obtain to a multi-layer filter which upstream and downstream layers are continuously charged to enhance adsorption of the particles in a particle-receiving layer.

Typically either the upstream or downstream layer is also grounded.

The conductivity of the upstream and downstream layers is attained by providing the filter with layers of conductive material which is porous enough for letting the air passing through.

In particular, in the present invention, activated carbon containing conductive layers are used either upstream or downstream or both. The activated carbon provides properties of gas adsorption as well as conductivity.

According to the invention, the filtration medium therefore comprises in combination a conductive substrate, an insulation substrate and a gas adsorption substrate which has properties of electrical conductivity and which is electrically separated from the conductive substrate by the insulation substrate.

More specifically, the present filtration medium is characterized by what is stated in the characterizing part of claim 1.

The method according to the invention is characterized by what is stated in the characterizing part of claim 27.

The uses according to the invention are characterized by what is stated in the claims 30 to 32.

Considerable advantages are obtained. Thus, the present materials give extremely high particulate capturing efficiencies at extremely low pressure drops.

The present invention can be used in electrified filters for cabin air filtration for passenger cars and other vehicles. The present invention can also be used for HVAC filtration for indoor air, and in portable air purification units and even in vacuum cleaners.

Next embodiments will be examined in more detail with the aid of the appended drawings.

EMBODIMENTS

A number of exemplifying and non-limiting embodiments of the invention are described in accompanied dependent claims.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

As defined herein, the term "fibrous" means a material that is composed predominantly of fibers and/or staple fibers.

In the present context, the term "thermoplastic" means a plastic which becomes pliable or moldable above a specific temperature and returns to a solid state upon cooling. Exemplary thermoplastic fibers suitable for the present disclosure are polyesters (e.g., polyalkylene terephthalates such as polyethylene terephthalate (PET), polybutylene terephthalate (PBT) and the like), polyalkylenes (e.g., polyethylenes, polypropylenes and the like), poyacrylonitriles (PAN), and polyamides (nylons, for example, nylon-6, nylon 6,6, nylon-6,12, and the like).

In the present context, the term "substrate" is used for designating layered structures with 1 or several layers, which substrates together form the present filter medium. In the below description, the gas adsorption substrate is also referred to as a "layered structure" to reflect that it comprises several overlapping layers.

In the present context, "electrified filters" stands for filters to which an electric voltage can be directed for enhancing filtering. In the electrified filters, the electric field guides charged dust particles into the filter material. Depending on actual application and the thickness of the insulation, the voltage between the conductive layers of the filter medium can vary in the range from about 100 V to 3 kV.

Figure 1:
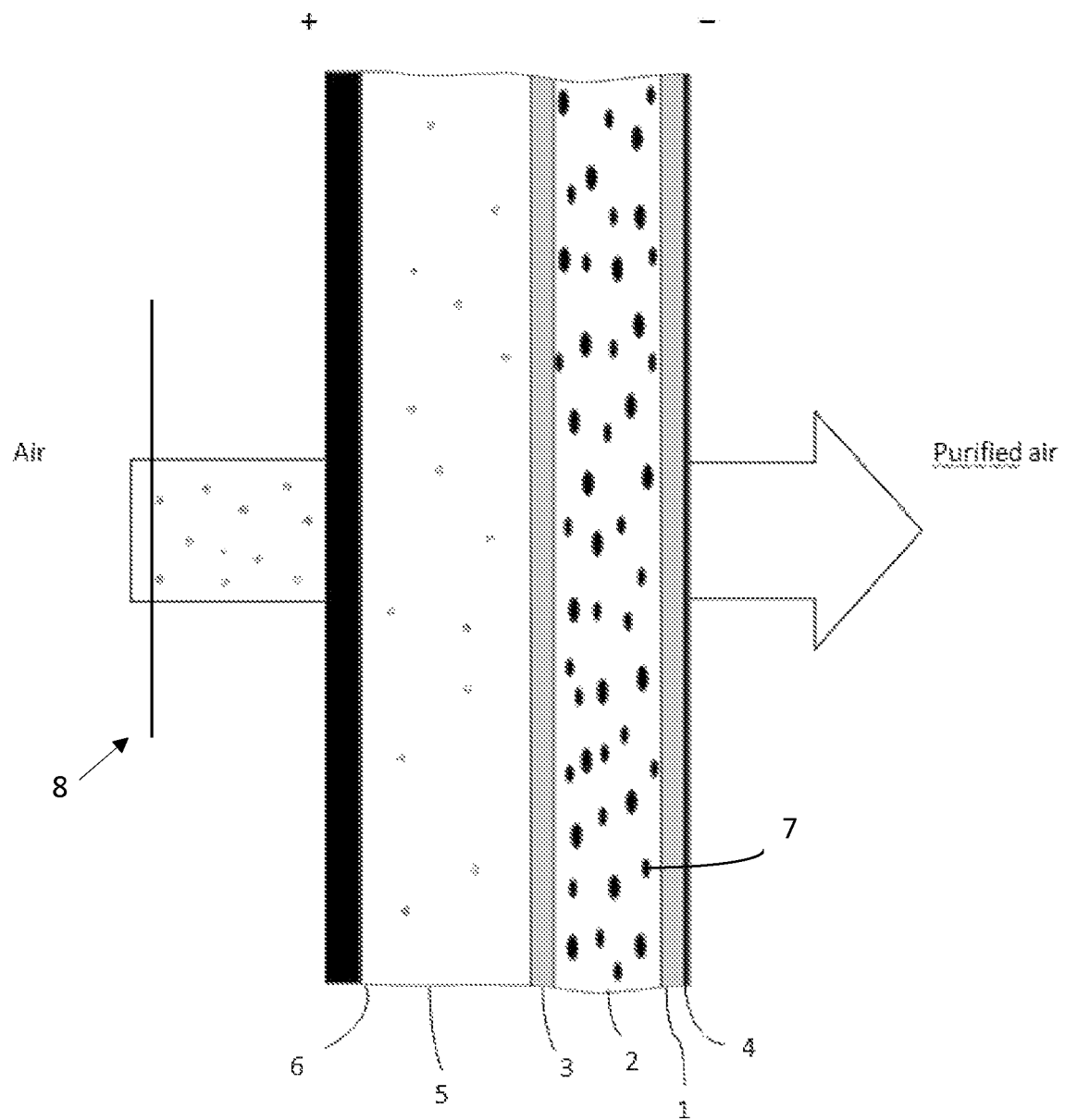
FIG. 1 shows in a schematic fashion in sideview the cross-section of a gas adsorbing substrate according to an embodiment of the invention.

As shown in FIG. 1, in one embodiment, a filtration arrangement is provided, which comprises a pre-charging unit 8 for ionizing contaminant particles contained in a gas flow upstream, i.e. before a filtering unit, which contains a multi-layered filter medium with substrates 6, 5 and 1-4. Upstream layer 6 and downstream layers 1-4 are continuously charged. Either the upstream or downstream layers can also be grounded. The conductivity of the upstream and downstream layers is gained by a conductive material which is porous enough for letting the air passing through.

The pre-charging unit 8 is typically a corona wire or a similar charger device for generating ionization. Typically the charger unit 8 is fed with a high voltage. The voltage is for example 500 V to 10 kV.

In particular, in at least one of the layers, for example in one of layers 1-4, activated carbon is used, cf. reference numeral 7. The activated carbon substrate 1-4 is electrically conductive.

In the embodiment of FIG. 1, the activated carbon substrate 1-4 is placed downstream, but it is also possible to place it upstream, and the conductive layer 6 downstream.

As will be discussed in more detail, the activated carbon also acts as a gas adsorbing substance and it capture harmful gases and gas components from the gas flow and prevent or at least greatly reduce such emissions from the filter.

In one embodiment, the filter medium 1-6 is arranged into a conventional filter system, for example by first pleating or folding the medium and then placing it into a frame.

Figure 3:
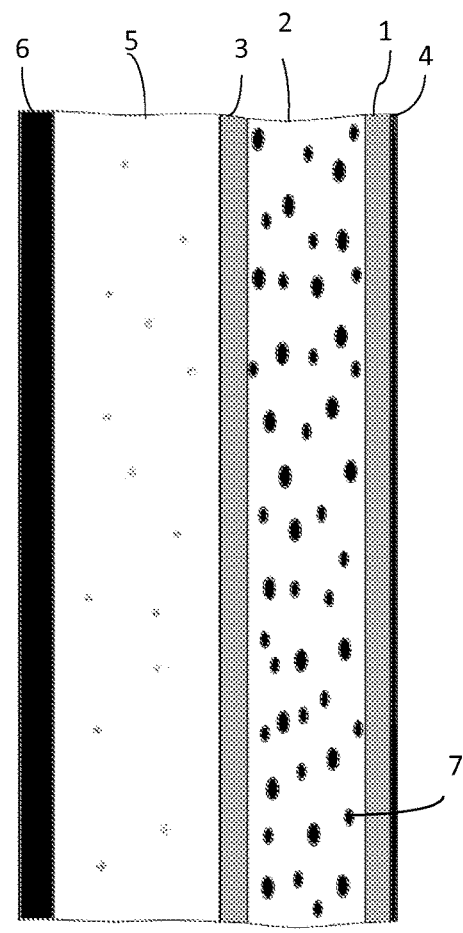
FIG. 3 shows in a schematic sideview filtration of dust-laden air with an electrified filter of the present kind.
Figure 4:
FIG. 4 is an SEM showing granules of activated carbon embedded into a fibrous layer (gas adsorption layer)

FIG. 3 shows in greater detail the filtration medium of FIG. 1.

The conductive layer 6 shown in FIG. 3 typically comprises a matrix formed by a fibrous, porous web, for example a non-woven web, which has been impregnated with a conductive component. Generally, the web can have a grammage of about 10 to 500 $g/m^2$, although a grammage of about 10 to 50 $g/m^2$, in particular about 15 to 30 $g/m^2$ is preferred in order to attain proper porosity and low pressure drop of the filter medium 1-6 in its entirety.

The fibrous web 6 can comprise fibers selected from polymeric fibers and inorganic fibers. The polymeric fibers can be natural or synthetic or combinations thereof.

Examples of natural fibers include cellulose fibers. Cellulose fibers can be selected from the group of natural or regenerated cellulose fibers, such as cellulose, lyocell, viscose and any other derivatives of cellulosic fibers. Chemical wood pulp can also be used as such or in combination with other natural or regenerated cellulose fibers.

Natural or regenerated natural fibers will give good inherent strength properties as such. Additional binding fibers, for example bicomponent synthetic fibers, can be used in combinations comprising both natural and synthetic fibers, such as thermoplastic fibers, but the natural fibers may provide sufficient bonding and inherent strength as such without there being a need to add binding fibers.

Polymeric fibers which can be used in or as a part of the matrix web are typically thermoplastic fibers, such as polyester, polyethylene, polyethylene terephthalate, polyolefin, polybutylene terephthalate and/or polyamide.

Inorganic fibers are exemplified by glass fibers and glass fiber strands.

The matrix comprises, for example 1 to 99 parts, in particular 10 to 90 parts, natural fibers and 99 to 1 parts, in particular 90 to 10 parts, synthetic fibers.

The porous web is typically made conductive by incorporating therein a conductive component. In one embodiment, the porous web is impregnated with a conductive component to render the web conductive. The conductive component is for example a conductive ink. The conductive ink can comprise particles of metals, such as silver or copper mixed with a binder. The particles can be granular, or formed by finely-divided powders or platy particles. The conductive ink can also comprise conductive carbon particles, e.g. carbon black, such as coconut shell carbon black. Carbon black typically is present in the form of a finely divided powder.

Typically the conductive ink contains a binder for the conductive component for bonding it to the substrate or material which is to be rendered conductive. The binder can be a thermoplastic or thermosetting material, for example an acrylate, alkacrylate (methacrylate), epoxide or amine binder. The concentration of the binder is, for example up to 50 wt %, preferably 1-35 wt %, more preferably 2-25 wt %, based on the total weight of the layer.

It is also possible to use conductive ink comprising conductive polymers. Suitable polymers include polyaniline, polypyrrole, polyacetylene, polytiophen and polyparaphenylene and their derivatives and mixtures. Suitable doping agents are selected depending on the polymer; dodecylbenzensulphonacid (DBSA) is a doping agent typically used for polyaniline.

In a preferred embodiment, the conductive layer 6 is formed by non-woven matrix impregnated with a non-polymeric component, viz. carbon black as a conductive component.

The conductive ink, mixed with a binder, is applied onto the porous material such that porosity of the fibrous web is essentially maintained. Therefore, the coating is applied such that the formation of a continuous film is avoided.

Typically, the conductive layer exhibits a surface resistivity of less than 1 MOhm/sq or a volume resistivity of less than $10^{10}$ Ohm-cm.

The thickness of the conductive layer is generally in the range from about 0.01 mm up to 2 mm, in particular about 0.05 to 1 mm, for example 0.1 to 0.5 mm.

The insulation layer 5 typically comprises fibers, in particular fibers of natural or synthetic polymers or combinations thereof. Thus, in one embodiment, the insulation layer is produced from cellulose fibers or lignocellulose fibres. Natural fibers generally provide good insulation properties.

In one embodiment, the insulation layer is produced from synthetic fibers, such as thermoplastic fibers. Examples of suitable thermoplastic materials include polyolefin or in particular polyester fibers. It has been found that polyester fibers, such as fibers of poly(ethylene terephthalate), PET, will provide electrical insulation in combination with good hydrophobicity and dust holding capacity.

The layer can further be treated with a water-repellent agent, such as an organo-polysiloxane, a fluororesin, a wax or a similar substance which enhances hydrophobicity of the layer.

The insulation layer is capable of holding and binding particles. The thickness of the layer is generally in the range from about 0.1 mm up to 5 mm, in particular about 0.5 to 4 mm, for example 1 to 3 mm or 1 to 2 mm.

In one embodiment, the insulating layer has a grammage of 50 to 250 g/m$^2$, in particular 70 to 200 g/m$^2$.

Typically, the insulating layer exhibits a surface resistivity of more than 10 MOhm/sq or a volume resistivity of more than $5 \times 10^{10}$ Ohm-cm.

Figure 2:
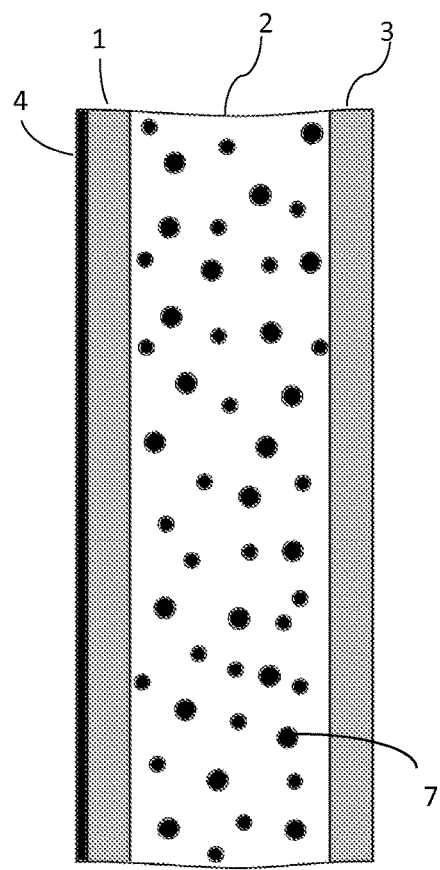
FIG. 2 shows in a schematic sideview the cross-section of a filtration medium comprising a conductive substrate layer, an insulation layer and a gas adsorption substrate layer.

FIG. 2 shows in sideview on embodiment of the gas adsorbing layer 1-4.

In the embodiment shown in FIG. 2, the porous gas adsorbing layer comprises a combination of three overlapping layers, viz. a first layer 1 with first fibers having a first average diameter; a second layer 2 with second fibers having a second average diameter; and a third layer 3 with third fibers having a third average diameter.

Typically, at least a majority of the fibers of three (or more) overlapping layers are independently from each other selected from the group consisting of polymeric fibers and inorganic fibers, wherein the polymeric fibers are preferably selected from thermoplastic fibers, such as polyester, polyethylene, polyethylene terephthalate, polyolefin, polybutylene terephthalate and/or polyamide, and wherein the inorganic fibers are preferably glass fiber strands. Polymeric fibers are particularly preferred.

The fibers make up a majority of weight of the various layers. Thus, in one embodiment, the fibers of the first layer are present in an amount of at least 65 wt. %, preferably at least 80 wt % based on the total fiber weight of the first layer; the fibers of the second layer are present in an amount of at least 65 wt. %, preferably at least 80 wt % based on the total fiber weight of the second layer; and/or the fibers of the third layer are present in an amount of at least 65 wt. %, preferably at least 80 wt % based on the total fiber weight of the third layer.

The first, second and third fibers can each be the same fibers or they can be made up of mixtures of fibers having different average diameters.

In one embodiment of a multilayered, for example 3-layered structure, the second layer 2, interposed between a first 1 and a third layer 3, contains synthetic fibers having an average diameter of less than 10 μm mixed with synthetic fibers having an average diameter of greater than 30 μm. It can also contain fibers having an average diameter in the range from 10 to 30 μm. For example, the second layer may be formed from a mixture of fibers having an average diameter of 7 μm, 12 μm and 40 μm. The fiber mix will provide for increased porosity of the second layer which is advantageous for incorporation of activated carbon, for example in particulate form (as granules). Fibers having average diameters in the range of about 40 μm will improve the strength properties of the second layer (i.e. the middle layer).

Typically, the first 1 and the third layers 3 contain fibers which have average diameters that are smaller than the average diameter of the fibers of the second layer. For example the first and third layers may be formed from a mixture of fibers having an average diameter of 7 μm and 12 μm.

In one embodiment, the first 1, the second 2 and/or the third 3 layer further contains up to 50 wt %, preferably from 2-35 wt %, more preferably 2-25 wt % of binder fibers based on the total weight of each of the first and/or third layers. Examples of suitable binding fibres include bicomponent synthetic fibers, e.g. bicomponents fibers selected from the group of PET-CoPET, PET-CoPE, PE-PET and combinations thereof.

In one embodiment, bi-component fibers present as binder fibers in the various layers of the gas adsorbing layer have an average diameter in the range from about 17 μm up to about 30 μm.

The gas adsorbing layered structure 1-4 is porous—just as the conductive layer 6 and the isolation layer 5, and it will allow for low pressure drop during filtration. The gas adsorbing layers 1-4 exhibit properties of conductivity which are sufficient to enable the use of the gas adsorbing layer 1-4 as a conductive layer in combination with a conductive layer (for example the conductive layer 6) and a isolating layer (for example the isolating layer 5) in a filter element which, when it is subjected to a voltage applied over the filter element, is being electrified.

In the present context the terms "adsorb" will be used for designating the sorption of substances, such as gases, to the activated carbon, and thus the layer containing activated carbon will be referred to as an "adsorption" layer.

In one embodiment, the activated carbon comprises activated carbon powder, in particular a powder formed by particles 7 having an average particle size in the range of 0.1 to 1.5 mm, in particular 0.3 to 1.0 mm.

In one embodiment, the activated carbon comprises activated carbon fibers or activated carbon in the form of pellets having a diameter of 0.1 to 2 mm, in particular 0.5 to 1.5 mm, and a length of 0.5 to 2 mm.

In one embodiment, the activated carbon is homogeneously distributed throughout the second layer. "Homogeneously" means that the activated carbon granules, fibers or pellets evenly cover the layer such that on a subarea unit forming 1/10 of the total surface on which activated carbon is spread contains an amount of carbon proportional to the size of the area ±20%. In other words 1/10 part of the total area contains 1/10 of the total amount of carbon ±20% by weight.

Typically, layer 2 comprises activated carbon 7 in an amount sufficient to render the layer conductive. Thus, the loading of activated carbon can about 1 to 1000 g/m², in particular 10 to 750 g/m², suitably 20 to 500 g/m², for example 50 to 350 g/m².

The activated carbon typically has a large specific surface, amounting to more than 500 m²/g, in particular more than 750 m²/g, for example 800 m²/g or more, typically up to 2000 m²/g.

The gas adsorbing layer will not only provide for electrical conductivity but it will also adsorb gases, such as nitrogeneous oxides and carbon oxides, and in particular ozone. Thus, the gas adsorbing layer will prevent hazardous ozone generated during ionization of particles contained in gas to be filtered from escaping the filter element. This is of particular relevance with regard to the use of the present filter elements in applications such as ventilation of buildings and vehicles.

In one embodiment, the first 1 and/or the third layer 3 further contains up to 50 wt %, preferably from 2-35 wt %, more preferably 2-25 wt %, based on the total weight of each of the first and/or third layer, of a binder. Such a binder will enhance the mechanical properties of the layers. Typically the binder can be selected from the group of acrylate, methacrylate, epoxide and amine binders and combinations thereof. Preferably, the second layer is free from a binder, which is liquid or solid (hot melt glues) at room temperature, to avoid a loss of specific surface are of the activated carbon with would impair gas adsorption properties of the layer 1-4.

To enhance properties of electrical conductivity, the gas adsorption layer structure 1-4 can be coated with a layer 4 of conductive substances, as explained above in relation to conductive layer 6. Thus, a coating comprising conductive ink can be deposited on the surface of the gas adsorption layer. The conductive ink can comprise particles of metals, such as silver or copper mixed with a binder. The particles can be granular, or finely-divided powders or platy particles. Further, the conductive ink can contain conductive carbon particles, e.g. carbon black, such as coconut shell carbon black. It is also possible to use conductive ink comprising conductive polymers.

Typically the conductive ink contains a binder for the conductive component for bonding it to the substrate or material which is to be rendered conductive. The binder can be a thermoplastic or thermosetting material, for example an acrylate, alkacrylate (methacrylate), epoxide or amine binder. The concentration of the binder is, for example up to 50 wt %, preferably 1-35 wt %, more preferably 2-25 wt %, based on the total weight of the layer.

The conductive ink mixed with the binder is applied to the porous material such that porosity is at least essentially maintained. Therefore, the coating 4 is applied such that the formation of a continuous film on top of the gas adsorption substrate is avoided. To that aim, in one embodiment, the conductive ink is applied onto the surface of the gas adsorption substrate in the form of a mixture having high solid matter content, and any solvent is evaporated off immediately after application.

In one embodiment, the gas adsorbing layer structure 1-4 has a grammage of 250 to 500 g/cm², in particular 250 to 450 g/cm².

The gas adsorbing substrate is capable of holding and binding particles. The thickness of the substrate is generally in the range from about 0.1 mm up to 5 mm, in particular about 0.5 to 4 mm, for example 1 to 3 mm or 1 to 2 mm.

Typically, the gas adsorption layer, optionally coated with a conductive layer of the afore-mentioned kind, exhibits a surface resistivity of less than 1 MOhm/sq or a volume resistivity of less than $10^{10}$ Ohm-cm.

The loading of the conductive carbon, in the form of carbon black in the coating 4 of the gas adsorbing layer, is preferably in the range of 1 to 20 g/m², for example about 5 to 15 g/m².

It has been found that the filter medium described herein has excellent mechanical properties. In particular, the present medium shows a very high bending stiffness of at least 500 mg as obtained from its bending resistance according to TAPPI Standard T 543 (Gurley-type tester). The medium can also be pleated and can maintain its shape without significant deformation during use.

The medium also has a high pore volume within the substrate which allows for high permeability values. Preferably, the air permeability of the inventive medium is at least 5 cfm as measured according to ASTM D737, for an area of 38 cm² and a pressure of 125 Pa.

In particular, air permeability of the filter medium is typically 100 to 10,000 l/m²s, in particular at least 1000 l/m²s. The pressure drop during filtration is less than about 500 Pa, for example less than 400 Pa, in particular less than 100 Pa, suitably less than 60 Pa and even less than 45 Pa.

It has been further found that the filter medium according to the invention has a filtration efficiency of more than 80%, in particular more than 85%, preferably more than 90% or even more than 95%, against 0.4 micron particles at a face velocity of 5.3 cm/s when tested according to EN 779 test method.

Surprisingly, the medium shows a reduced pressure drop over time as compared to prior art filter media that have similar mechanical properties and particle removal characteristics.

The process for preparing the gas adsorption substrate (or layered structure) 1-4 preferably comprises the steps of
  providing first, second and third slurries of fibers, as discussed above, slurried in water;
  supplying the first slurry onto a dewatering screen to form a first deposit;
  supplying the second slurry onto the first deposit to form a second deposit on top of the first deposit;
  supplying the third slurry onto the second deposit to form a third deposit on top of the second deposit;
  removing the water from the deposits to form a wet fibrous mat or sheet; and
  drying the wet fibrous mat or sheet while heating to form a substrate.

The second slurry contains, in addition to the fibers, activated carbon in the form of particles or fibers, in particular granular activated carbon.

The synthetic fibers used in the first, second and third layers are preferably staple fibers having a maximum length.

In one embodiment, the first slurry comprises water and the first fibers, as described above, at least 80% of the fibers being in the form of synthetic fibers, in particular staple fibers, having a diameter in the range from 7 to 12 μm.

In one embodiment, the second slurry comprises water and the second fibers, as described above, at least 80% of the fibers being in the form of synthetic fibers, in particular staple fibers, having a diameter in the range from 7 to 40 μm.

In one embodiment, the third slurry comprises water and the third fibers, as described above, at least 80% of the fibers being in the form of synthetic fibers, in particular staple fibers, having a diameter in the range from 7 to 12 μm.

In one embodiment of the present process, first, second and third homogenous slurries are provided. These slurries can be provided by any method known in the art such as by adding and mixing the fibers in water.

Once the first, the second, and the third homogeneous slurries are prepared, they are applied onto a dewatering screen. This screen can be any screen commonly used in a paper making process. Preferably, this screen is a dewatering endless screen. Upon supplying the first slurry onto the dewatering screen, a first deposit is formed on the screen. Subsequently, the second slurry is supplied onto the first deposit to form a second deposit on top thereof. Then, the third slurry is supplied onto the second deposit to form a third deposit on top of the second deposit. Supplying the first, the second and the third slurries can be carried out by using different channels of a headbox of a wetlaid forming machine. Alternatively, the slurries can be applied one after the other using an dynamic handsheet former from Techpap SAS (Grenoble, France). During or after deposition of the individual slurries, water is removed to form a wet fibrous mat or sheet. Subsequently, the wet fibrous mat or sheet is dried while heating to form the substrate. This substrate—as defined herein above—comprises the first, the second, and the third layer comprising the individual fibers.

In one embodiment, by applying the first, the second, and the third slurries on top of each other, the boundary areas between adjacent layers form blended areas comprising first and second or third and second fibers.

Within such boundary areas, the components of the first and second and the components of the third and second layers intermingle with each other such that there is a fibrous interlock rather than a sharp and defined edge which would separate the individual layers from each other.

The surface of the filter medium containing activated carbon is optionally coated with a layer of conductive components to increase conductivity of the filter medium. Such coating can be carried out by any conventional coating method, in particular by printing or spraying, using a slurry of a conductive component mixed with a binder, slurried in a liquid, such as water. By evaporating the liquid off the slurry, a thin layer of the conductive component is disposed on the surface of the medium. The amount of the binder is limited such that no continuous film is formed on the surface of the gas adsorption layer but only discrete areas which bond the conductive component to the fibers of the first layer. Typically, the amount of binder is less than about 40%, in particular less than 30%, for example 20 to 5%, of the total weight of the conductive component and the binder. Thus, the porous surface of the material is maintained after deposition of the conductive component.

As discussed above, in one embodiment, the conductive layer 6 comprises a matrix formed by a fibrous web, for example a non-woven web, which has been impregnated with a conductive component. When a non-woven web is used as a matrix, it can be produced by a wet-laying or dry-laying process as known per se. The web has a grammage of about 10 to 50 $g/m^2$, in particular about 15 to 30 $g/m^2$.

For impregnation of the web with a conductive component, the web is coated from one side, preferably from both sides with a slurry containing the conductive component, a binder and a liquid, such as water. In order to achieve penetration of the conductive component into the web, the slurry generally contains, in terms of weight, equal amounts of conductive component and binder—preferably the amount of the binder is more than 60%, in particular more than 65%, for example 70 to 85%, of the total weight of the conductive component and the binder. The conductive component is impregnated into the matrix in amounts of 10 to 50%, in particular 20 to 40% of the total weight of the conductive layer.

As discussed above, the insulation layer 3 comprises a fibrous layer comprising or consisting of synthetic of natural or regenerated fibers, preferably synthetic fibers which have been formed into a non-woven layer for example by wet- or dry-laying techniques, optionally with the use of hydroentangling or needle punching.

The three layers 1-4, 5 and 6 are combined into a filtration medium by layering so as to mechanically join the layers to each other by means of the natural adhesion of the fibers. It is preferred not to use essentially any binder in the interphases between the layers so as not to impair the porosity of the layered medium.

The layered medium can be pleated in a manner known per se.

The filter medium of the present invention is preferably used in a way such that the fluid to be filtered exits the filter medium at the side of the substrate upon which the fine fiber layer is allocated.

Example

Material:

The filter medium tested was formed by a combination of a conductive layer, an insulation layer, and a gas adsorption layer with a coating on top of the gas adsorption layer. The material layers were mechanically joined together by placing the layers in overlapping relationship while avoiding the use of adhesives which otherwise might impair porosity and increase pressure drop. The three layered structure was pleated so as to form a filtration element.

The conductive layer had a grammage of about 37 $g/m^2$ and it comprised a non-woven sheet formed by a mixture of natural and regenerated cellulose fibers (cellulose, chemical wood pulp and viscose) mixed with PET fibers. The viscose and the PET fibers had an average diameter of about 15 µm. The non-woven sheet was conferred conductivity properties by impregnating it with a mixture of 1 part of coconut shell carbon black and 3 parts of acrylate binder to yield a carbon black loading of 7.5 $g/m^2$/side.

The insulation layer was a uniform layer consisting to 100% by polyester fibers and it had a grammage of 100 $g/m^2$.

The gas adsorption layer was formed by a three-layered non-woven structure comprising a middle layer formed by a mixture of PET fibers mixed with activated carbon granules interposed between two polymer sheets or layers formed by mixtures of PET fibers. The PET fibers of the middle layer had an average diameter of up to 40 µm. The middle layer contained 250 $g/m^2$ of carbon granules having an average diameter of 0.3 to 1.0 mm and exhibited a surface area of about 1000 $m^2/g$. The polymeric PET fiber layers contained fibers having average diameters of 7 µm and 12 µm. Each of the three layers further contained, mixed with the PET fibers, bi-component binding fibers having an average diameter of 17 to 30 µm, while the polymeric PET fiber layers also contained acrylate binder. Furthermore, one surface of the non-woven structure was provided with a top coating formed by carbon black particles, derived from coconut shell, mixed with an acrylate binder. The carbon black loading was 10 $g/m^2$.

The grammage of the gas adsorption substrate was 350 $g/m^2$.

A filtration medium formed by the three layers on top of each other was mechanically layered, pleated and placed in a filter frame.

Non-woven materials, modified with activated carbon, are supplied by Ahlstrom, Tampere, Finland, under the tradename Trinitex.

Test Method:

The filter materials were tested as follows:

The tests were done by applying the principles of the EN779 standard for general ventilation filters. The filtration properties measured in laboratory tests were pressure drop and fraction filtration efficiency. The particles were charged with corona wire charger. The polarity of the corona wires was positive.

The efficiencies were measured in four cases: no voltages connected, only charger voltage connected, only collection voltage connected and both charger and collection voltage connected. The collection voltage polarity was also positive.

The filter system was installed and sealed tightly between two chambers in a filter measurement system. In this measurement the air flow was set at 288 m³/h. The air flow through the filter element was measure with a measurement ring, which was calibrated with a venture tube. The pressure drop was determined by measuring the pressure difference between upstream and downstream chambers with micromanometer DPM TT 470S.

The efficiency was determined by measuring the particle concentrations upstream and downstream of the filter elements with an optical particle size analyzer, PMS LAS-X2, in particle size range from 0.1 to 2 um. The test aerosol used was polydisperse DEHS (Di-Ethyl-Hexyl-Sebacate) particles generated with a Laskin-type aerosol generator.

The fractional filtration efficiency E(dp) was calculated with the following equation:

$$E(d_p) = 100 * \left(1 - \frac{C_2(d_p)}{C_1(d_p)}\right),$$

where $C_1(dp)$ is the concentration of a particle size range on the upstream side of the filter elements and $C_2(dp)$ is the corresponding concentration on the downstream side of the filter elements.

Results:

The pressure drop was measured with an air flow corresponding to a face velocity of 5.3 cm/s. It was noticed that the coating had practically no effect on pressure drop. In fact, at a pressure drop of less than 50 Pa, a filtering efficiency of over 90% and even over 95% was achieved for particle sizes in the range of about 0.1 to 2 µm.

Figure 5:
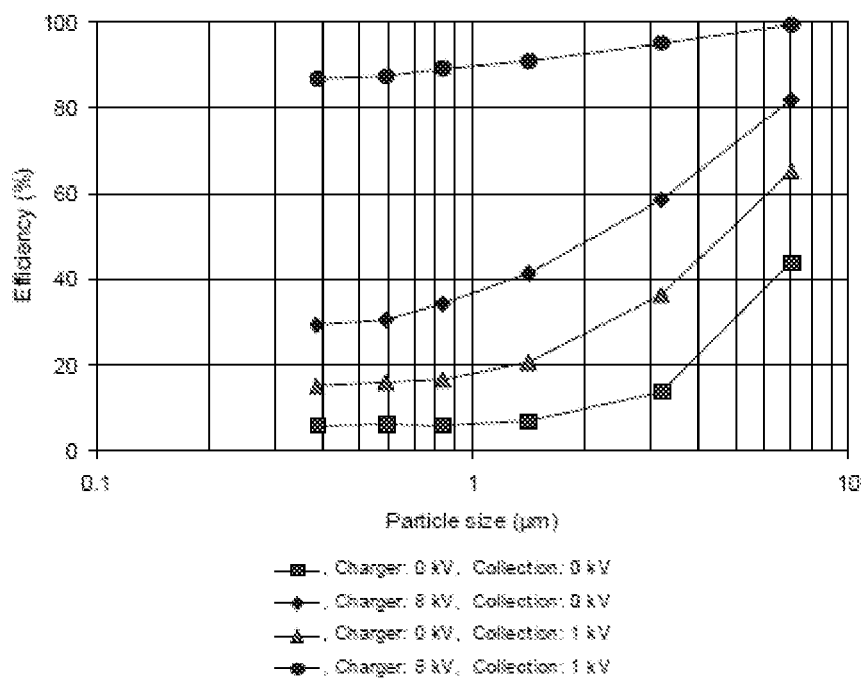
FIG. 5 shows the separation efficiency of layers containing activated carbon.

The results also showed that it is possible to replace conventional metal net electrodes with an layer of conductive material. In particular, FIG. 5 shows that conventional electrodes could be replaced with activate carbon nonwoven, i.e. the gas adsorption layer (ref. nos. 1-3) can be used as such even without an additional coating layer of carbon ink (ref. no. 4)

The filtration efficiency was high also with these electrode materials. It is worth noticing that a part of ozone generated by particle charger can be removed from the air flow by utilizing activated carbon as an electrode.

Figure 6:
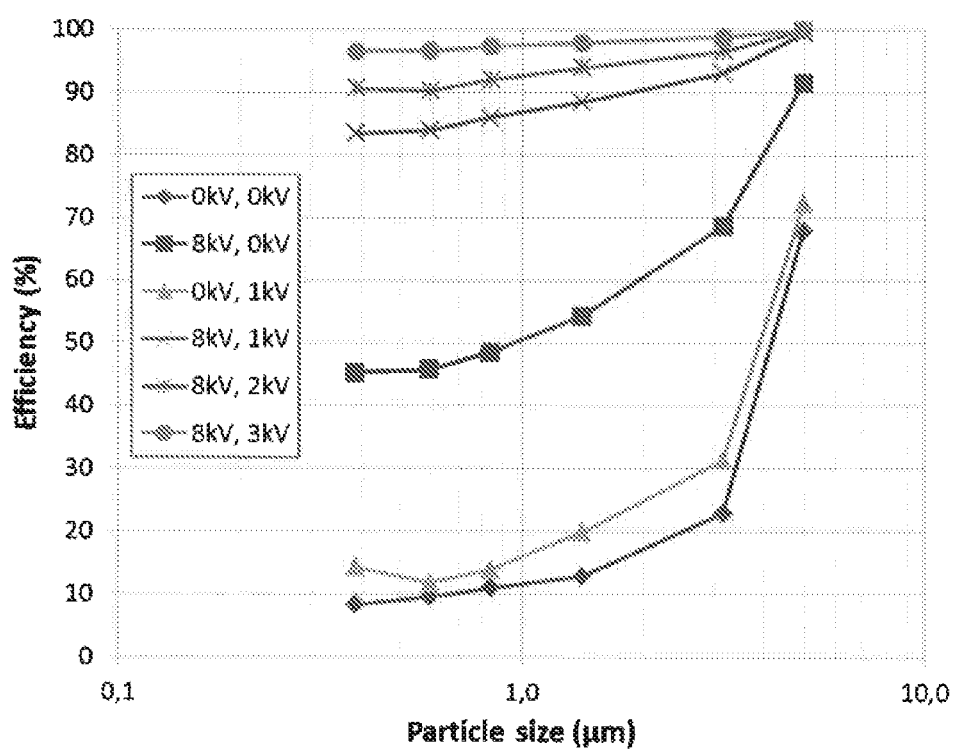
FIG. 6 shows the separation efficiency for a filter medium comprising three overlapping layers, according to one embodiment of the present invention.

The results of the fractional filtration efficiency of the filter material (ref nos. 1-6) are shown in FIG. 6.

REFERENCE SIGNS LIST

1 Non-woven layers containing PET fibers
2 Non-woven layer containing activated carbon granules
3 Non-woven layers containing PET fibers
4 Conductive coating
5 Insulation layer
6 Conductive layer
7 Activated carbon granules
8 Corona wire

CITATION LIST

Patent Literature

JP 5067084 B2
WO2007/135232A1
U.S. Pat. No. 7,513,933 B2
U.S. Pat. No. 5,403,383A
U.S. Pat. No. 7,717,986 B2
WO 9822222 A1
GB 2329598 A
CN 102225281

The invention claimed is:

1. A filter medium comprising
   a first conductive fibrous substrate;
   a second conductive fibrous substrate spaced apart from the first conductive fibrous substrate; and
   an insulation substrate fitted between the first and the second conductive fibrous substrates for electrically separating the first conductive fibrous substrate from the second conductive fibrous substrate;
   wherein the first conductive fibrous substrate comprises:
   a first layer with first fibers having a first average diameter;
   a second layer with second fibers having a second average diameter; and
   a third layer with third fibers having a third average diameter;
   wherein the second layer comprises activated carbon in an amount sufficient to render the first fibrous substrate conductive.

2. The filter medium according to claim 1, wherein the second layer is essentially free from a binder which is a liquid at application temperature.

3. The filter medium according to claim 1, wherein the activated carbon comprises activated carbon powder having an average particle size in the range of 0.1 to 1.5 mm.

4. The filter medium according to claim 1, wherein the activated carbon comprises activated carbon fibers or activated carbon pellets.

5. The filter medium according to claim 1, wherein the activated carbon is homogeneously distributed throughout the second layer.

6. The filter medium according to claim 1, wherein the activated carbon is capable of adsorbing gaseous components from an air flow conducted through the filter medium.

7. The filter medium according to claim 1, wherein the first and the third layers are essentially free from activated carbon.

8. The filter medium according to claim 1, wherein the second layer comprises synthetic fibers having an average diameter of less than 10 µm mixed with synthetic fibers having an average diameter of greater than 30 µm.

9. The filter medium according to claim 1, wherein the first and the third average diameters are each smaller than the second average diameter.

10. The filter medium according to claim 1, wherein the first layer, and optionally the third layer, is coated with conductive carbon particles mixed with a binder to form a coating layer.

11. The filter medium according to claim 1, wherein the first layer, and optionally the third layer, is coated with a mixture comprising conductive carbon particles mixed with a binder, said mixture being applied upon a surface of the first layer to form a coating layer which contains 1 to 20 g carbon/m$^2$.

12. The filter medium according to claim 10, wherein a boundary area between the first layer and the coating layer is a non-blended area.

13. The filter medium according to claim 10, wherein the coating layer is capable of conferring enhanced properties of conductivity to the first conductive fibrous substrate.

14. The filter medium according to claim 10, wherein the coating layer is applied by printing or by spraying on the surface of the first layer.

15. The filter medium according to claim 10, wherein the first, the second and the third fibers independently from each other are selected from the group consisting of polymeric fibers and inorganic fibers, wherein the polymeric fibers are selected from polyester, polyethylene, polyethylene terephthalate, polyolefin, polybutylene terephthalate and/or polyamide, and wherein the inorganic fibers are glass fiber strands.

16. The filter medium according to claim 1,
wherein the first fibers in the first layer are present in an amount of at least 65 wt. %, based on the total fiber weight of the first layer;
wherein the second fibers in the second layer are present in an amount of at least 65 wt. %, based on the total fiber weight of the second layer; and/or
wherein the third fibers in the third layer are present in an amount of at least 65 wt. %, based on the total fiber weight of the third layer.

17. The filter medium according to claim 1, wherein the first, the second, and/or the third layer further comprises up to 50 wt % of binder fibers, based on the total weight of each of the first, second, and/or third layer.

18. The filter medium according to claim 1, wherein the first, the second, and the third layers comprise, independently from each other, bicomponent synthetic fibers selected from the group consisting of PET-CoPET, PET-CoPE, PE-PET, and combinations thereof.

19. The filter medium according to claim 1, wherein the first and/or the third layer further comprises up to 50 wt %, based on the total weight of each of the first and/or third layer, of a binder selected from the group consisting of acrylate, methacrylate, epoxide, and amine binders.

20. The filter medium according to claim 1, comprising 10 to 750 g/m$^2$ of activated carbon.

21. The filter medium according to claim 1, wherein the first conductive fibrous substrate exhibits a surface resistivity of less than 1 MOhm/sq.

22. The filter medium according to claim 1, wherein the second conductive fibrous substrate has a surface resistivity of less than 1 MOhm/sq.

23. The filter medium according to claim 1, wherein the insulation substrate has a surface resistivity of more than 10 MOhm/sq and comprises synthetic fibers selected from the group consisting of polymeric fibers and inorganic fibers, wherein the polymeric fibers are preferably selected from polyester, polyethylene, polyethylene terephthalate, polyolefin, polybutylene terephthalate and/or polyamide, and wherein the inorganic fibers comprise bicomponent synthetic fibers selected from the group consisting of PET-CoPET, PET-CoPE, PE-PET, and combinations thereof.

24. The filter medium according to claim 1, wherein the first conductive fibrous substrate has a grammage of 250 to 500 g/m$^2$.

25. The filter medium according to claim 1, wherein a boundary area between the first and the second layers forms a first blended area comprising the first and second fibers, and wherein a boundary area between the second and the third layer forms a second blended area comprising the second and third fibers.

26. The filter medium according to claim 1, wherein the filter medium has a filtration efficiency of more than 80% against 0.4 micron particles at a face velocity of 5.3 cm/s, when tested according to EN 779 test method.

27. A process for the preparation of a filter medium claim 1, the process comprising the steps of:
providing first, second and third homogeneous slurries;
supplying the first slurry onto a dewatering screen to form a first deposit;
supplying the second slurry onto the first deposit to form a second deposit on top of the first deposit;
supplying the third slurry onto the second deposit to form a third deposit on top of the second deposit;
removing water from the deposits to form a fibrous mat or sheet; and
drying the fibrous mat or sheet while heating to form a first conductive fibrous substrate;
wherein
the first slurry comprises water and first fibers having a first fiber average diameter;
the second slurry comprises water and second fibers having a second fiber average diameter, said second fibers being mixed with activated carbon particles; and
the third slurry comprises water and third fibers having a third fiber average diameter, and wherein the process further comprises:
providing a second conductive fibrous substrate; and
providing an insulation substrate between the first conductive fibrous substrate and the second conductive fibrous substrate for electrically separating the first conductive fibrous substrate from the second conductive fibrous substrate.

28. The process according to claim 27, wherein the second fibers have a second fiber average diameter which is greater that the first fiber average diameter and the third fiber average diameter.

29. A filter element including a filter medium according to claim 1.

* * * * *